United States Patent [19]
Kirner

[11] 3,803,597
[45] Apr. 9, 1974

[54] RADAR PLAN POSITION INDICATOR

[75] Inventor: Ernest Otto Kirner, Coral Springs, Fla.

[73] Assignee: The Bendix Corporation, Southfield, Mich.

[22] Filed: Apr. 10, 1972

[21] Appl. No.: 242,601

[52] U.S. Cl. ............... 343/5 R, 340/380, 343/14
[51] Int. Cl. ............................................. G01s 7/04
[58] Field of Search ........ 343/5 R, 7.9, 14; 340/380

[56] References Cited
UNITED STATES PATENTS

| | | | |
|---|---|---|---|
| 3,680,085 | 6/1972 | Signore | 343/14 |
| 3,323,126 | 5/1967 | Malone et al. | 343/7.9 X |
| 3,538,312 | 11/1970 | Genähr | 340/380 X |
| 3,713,143 | 1/1973 | Blitz | 343/5 R |

*Primary Examiner*—T. H. Tubbesing

[57] ABSTRACT

A radar plan position indicator includes a mechanically scanned arm on which is mounted an array of light sources, suitably lamps or light emitting diodes. Each light source is energized from a particular range gate or range filter, depending on the type of radar system. The mechanical arm is synchronized with a scanning antenna. Flexible leads or slip rings connect the light sources to the radar system.

In an alternative embodiment glass fibers are used to guide the light of a stationary array of light sources to the scanned arm.

2 Claims, 6 Drawing Figures

PATENTED APR 9 1974 3,803,597

RADAR PLAN POSITION INDICATOR

BACKGROUND OF THE INVENTION

This invention relates to radar indicators and more particularly to mechanically driven radar plan position indicators.

Conventional radar plan position indicators scan the direction of azimuth and range. This usually requires very fast response times which until recently only cathode ray tubes could provide. Light emitting diodes have fast response times and can now also be used in certain applications.

If only the azimuth is scanned, as FM/CW radar using a filter bank, the required response time is considerably slower. Even subminiature bulbs can then be used for radar displays. Light emitting diodes are particularly attractive since they are very reliable, inexpensive, small and require very little power. These considerations have led to the development of a new radar indicator which has a mechanically scanned arm on which an array of light sources, suitably light emitting diodes, is mounted. The quantity of light sources used is determined by the range or range resolution required. Each light source is energized from a particular range gate or range filter, depending on the type of radar system, pulse or FM/CW, exciting the indicator. The scanning arm is optimally synchronized with the scanning antenna. Flexible leads or slip rings connect the light sources to the radar system.

An alternate embodiment to be described includes a linear configuration of glass fibers which are used to guide the light of a stationary light array to the display surface.

The indicator to be described uses time sharing of the light array for the display surface. This is possible since the radar signals are sequenced by the scanning motion of the antenna. This time sharing principle reduces the number of light sources required to cover the display surface. The use of a filter bank in an FM/CW radar eliminates the switching matrix required to energize each light source. The indicator is thus ideally suited for an FM/CW system where the received spectrum is analyzed by a bank of filters. The new display is particularly suitable for use with light general aviation aircraft radar. In certain installations, a short, relatively straight, flexible shaft can be installed between the radar antenna and the scanning arm of the indicator so that the indicator scanning arm is mechanically ganged to and driven directly by the antenna.

BRIEF DESCRIPTION OF THE DRAWINGS

In the figures like reference numerals refer to like elements.

DESCRIPTION OF THE PREFERRED EMBODIMENT

Figure 1:
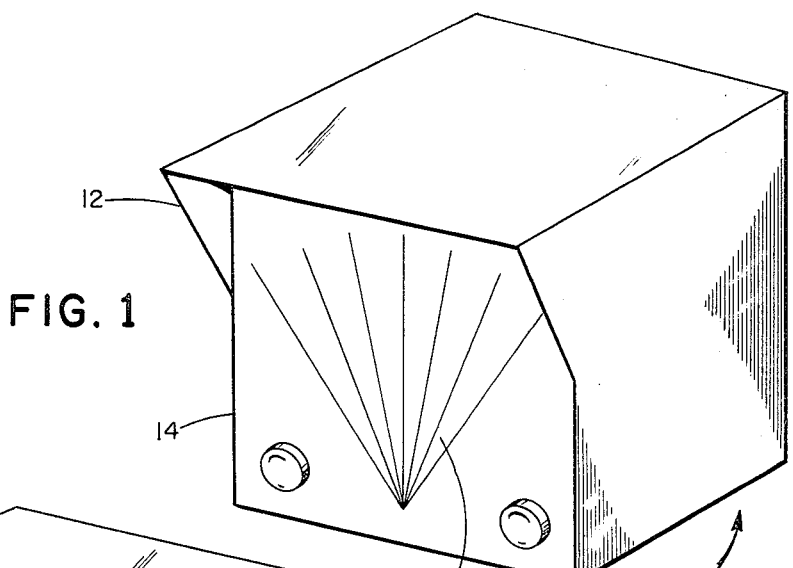
FIG. 1 is a perspective view of one embodiment of the invention.

Referring first to FIG. 1 there is seen a plan position indicator 10 built according to the present invention. It will be noted that the plan position indicator is very similar to presently used indicators which utilize cathode ray tubes. The indicator includes a hood cover 12 and a front panel 14 having a clear, see-through pie-shaped segment 16 through which the mechanically scanned array to be described is visible.

Figure 2:
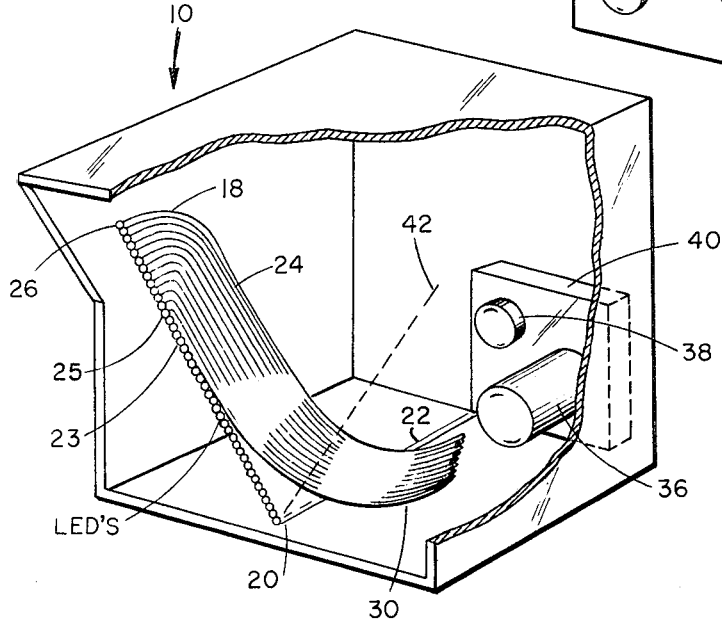
FIG. 2 shows the device of FIG. 1 with the front cover removed and one side and top cut away for clarity.

Referring now to FIG. 2 the plan position indicator of FIG. 1 is seen with the front panel removed and the hood cover on one side cut away for clarity. The indicator includes a mechanically scanned arm 18 which is comprised of a rectangular printed circuit board. A plurality of light sources, suitably light emitting diodes 23 are mounted on a long edge 25 of the scanning arm. This line of light emitting diodes forms the indicator array. The scanning arm is rotatably mounted at narrow edge 20 and driven by a shaft 22. Each light emitting diode is energizable through an individual track on the printed circuit board. For example, light emitting diode 26 which is energized through track 24. Flexible ribbon cables 30 connect the moving scanning arm to the stationary portion of the indicator whereby power is supplied to the scanning arm and hence to the light emitting diodes. A motor 36 and gear box 40 are provided for driving the scanning arm through shaft 22. A potentiometer 38 is ganged to shaft 22 and driven by motor 36 through gear box 40.

In the embodiment shown the scanning arm 18 scans through the angle defined by the scanning arm as shown and dashed line 42, which is an angle somewhat less than 90°.

Figure 3:
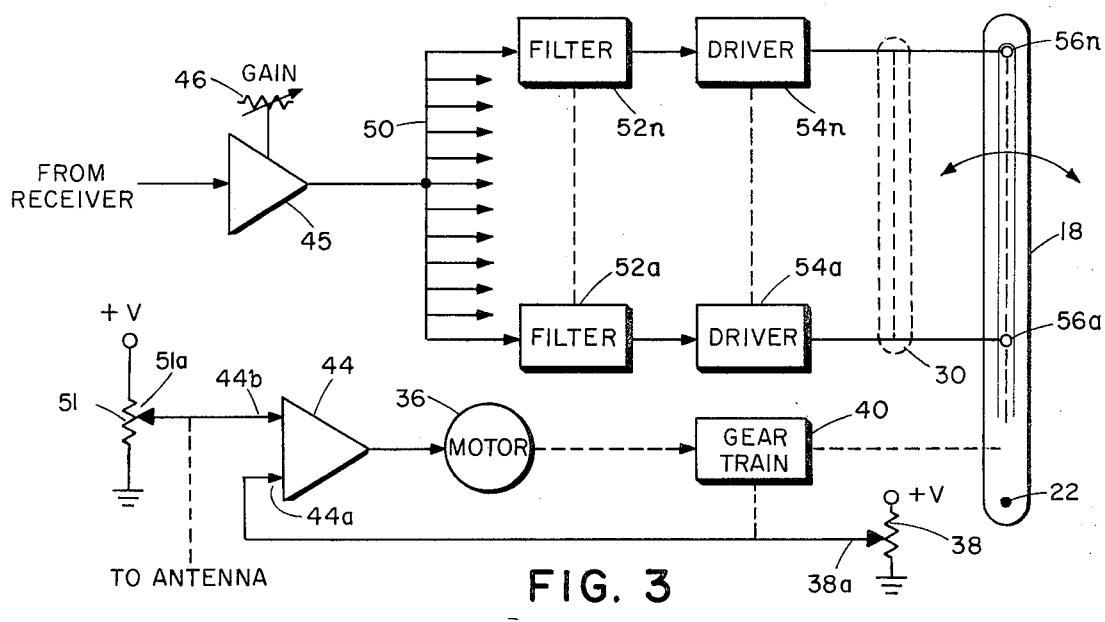
FIG. 3 is a partial block diagram of the circuitry used in the invention.

Refer now to FIG. 3. A servo amplifier 44 receives one input at terminal 44a from potentiometer 38 whose winding is connected across a d.c. voltage source (not shown). It will be remembered that potentiometer 38 is ganged through gear train 40 to shaft 22 in FIG. 2 and hence generates an output indicative of the position of the scanning arm. A second potentiometer 51 has its winding connected across the same d.c. source and its arm 51a mechanically ganged to the azimuth drive mechanism of a radar antenna. Arm 51a is electrically connected to the second input 44b of servo amplifier 44. The signal at terminal 44b is thus an electrical signal correlated to the azimuth position of the antenna.

Servo amplifier 44 compares the signals at terminals 44a and 44b and generates an error output signal which is applied to servo motor 36 which thereby drives scanning arm 18 through gear train 40. Motor 36, gear train 40 and scanning arm 18 are seen here and also in FIG. 2. It should now be obvious that by proper selection of the servo system constants the scanning arm will follow the motion of the radar antenna.

The radar return signal, which is here assumed to be from a FM/CW radar, is applied to an amplifier 45 having a front panel adjustable gain means represented at 46. The output from amplifier 45 is applied to bus 50. A plurality of sets of filters 52 and drivers 54 are connected in parallel between bus 50 and each light emitting diode on scanning arm 18. For example, filter 52a serially connected with driver 54a connects bus 50 to light emitting diode 56a. In like manner, filter 52n serially connected with driver 54n connects bus 50 with light emitting diode 56n. Each filter 52 defines an individual range cell graduated from a minimum range to a maximum range. The drivers are provided to amplify the output from the filters to energize the light emitting diodes. Flexible ribbon cable 30 is shown connecting the output from the drivers to the light emitting diodes.

Figure 4:
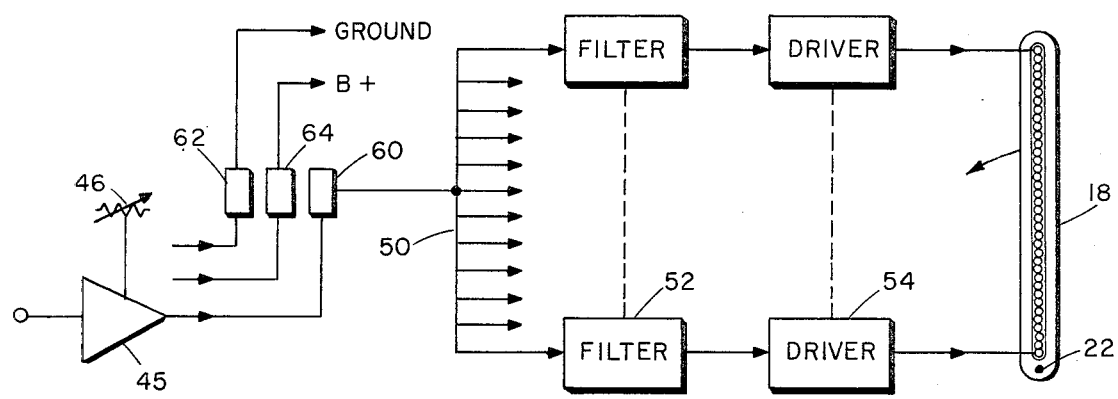
FIG. 4 is a partial block diagram of a form of circuitry used in the invention.

Refer now to FIG. 4 which illustrates a slightly different form of the invention. In this embodiment filters 52 and drivers 54 are mounted directly on scanning arm 18. As before, the scanning arm is driven by and pivots about shaft 22. The servo system for driving the scanning arm is essentially identical to that shown in FIG. 3 and is not repeated here. In this embodiment, the output from amplifier 45 having gain adjustment 46 is supplied through slip ring 60 to bus 50. Ground and B+ voltage for energizing the light emitting diodes are supplied through slip rings 62 and 64, respectively. Slip rings 60, 62 and 64 are mounted on shaft 22 and are the only electrical connections required for scanning arm 18 in this particular embodiment.

Figure 5:
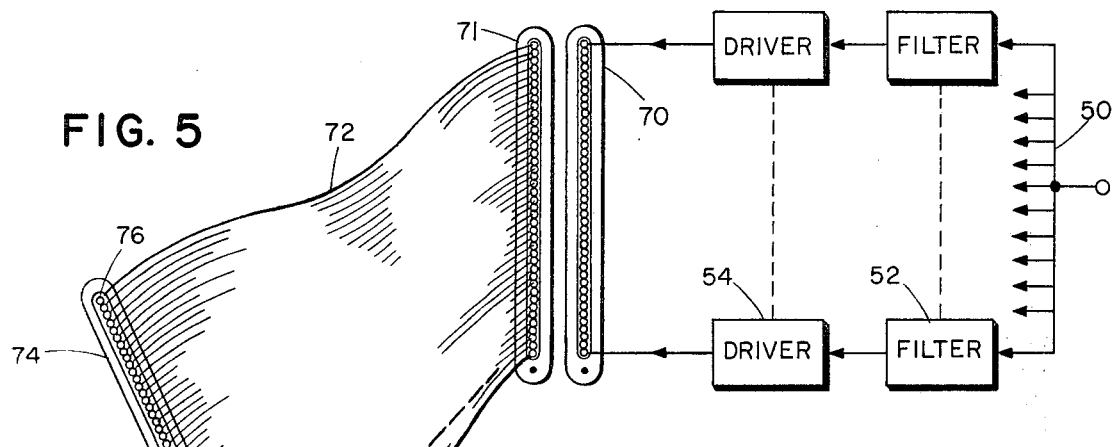
FIG. 5 is a modified block diagram of another form of the invention.

Refer now to FIG. 5 which shows another embodiment of the invention. In this embodiment bus 50 and filters 52 and 54 are seen as in the previous embodiments. The drivers 54 energize a linear light emitting diode array 70 which is held stationary. A flat ribbon of optical glass fibers 72 has one end 71 exposed to and in close juxtaposition with array 70 so that light energy from array 70 is transmitted into the fibers of ribbon 72. The other end 76 of ribbon 72 is held at arm 74 which is rotatively deiven about a shaft represented at 22. As before, a servo system is used for driving arm 74 and is not shown in this figure.

Figure 6:
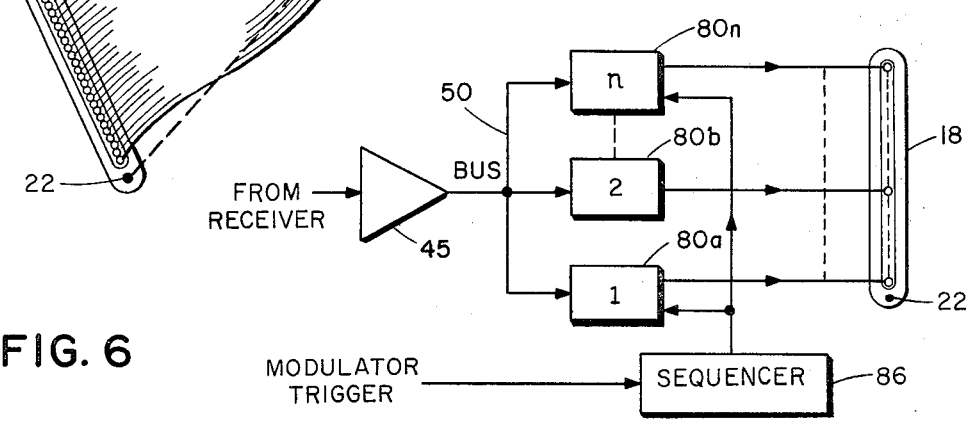
FIG. 6 is a block diagram illustrating the invention as used with a pulse type radar.

Refer to FIG. 6 which shows how the invention can be used with a pulse type radar. The radar return signal, which is here assumed to be from a pulse type radar, is applied to amplifier 45 the output of which is connected to bus 50. A plurality of range cells in the form of range gates 80a, 80b ..... 80n connect the common bus 50 to individual ones of the light emitting diodes on scanning arm 18. As before, scanning arm 18 is drivenly rotated about pivot axis 22. A sequencer 86, in the form of a timer, is started by a trigger pulse from the radar modulator and opens the range gates in timed sequence to permit a radar video signal at bus 50 to pass to the proper light emitting diode.

Having described a number of different embodiments of the invention various other modifications and alterations of the invention should now be obvious. The invention is thus to be limited only by the true scope and spirit of the appended claims.

The invention claimed is.

1. In a radar system including a sectorial scanning antenna for receiving radar return signals from remote targets, a plan position indicator comprising:

an arm pivotally mounted for oscillatory motion through a circular sector;

a linear array comprised of a plurality of light emitting devices mounted on said arm;

means for connecting said arm to said antenna for oscillating said arm about the pivot point synchronously with the scanning of a circular sector by said antenna;

a steering network including a plurality of individual range cells, one said range cell being associated with each light emitting device, for steering the radar return signals to a particular light emitting device as determined by the range of the target generating a particular radar return signal for said antenna; and, a flat ribbon-shaped bundle of optical fibers having a first end mounted on said arm and comprising said linear array and a second end, said steering network including said bundle and additionally including a second array comprised of a second plurality of light emitting devices, said second end and said second array being fixed and arranged with respect to one another so as to transmit light from said second array into said second end, said second array being interposed between said range cells and said second end.

2. In an FM/CW radar system including a scanning antenna for receiving radar return signals from remote targets and having a radar receiver for generating an output signal comprised of frequency signals within a predetermined frequency band, the presence of a particular frequency within said output signal being indicative of a radar return from a remote target within a particular range from said antenna, a plan position indicator comprising:

an arm rotatably fixed at a pivot point;

a linear array comprised of a plurality of light emitting devices mounted on said arm;

means for connecting said arm to said antenna for rotating said arm about said pivot point synchronously with the scanning of said antenna;

a plurality of individual filter means mounted on said arm, each said filter means being associated with and responding to a particular frequency within said predetermined frequency band, a said filter means generating an output in response to its associated frequency for energizing a predetermined one of said light emitting devices, all said filter means having a common input terminal; and, a single slip ring on said arm for connecting said radar receiver output signal with said common input terminal.

* * * * *